United States Patent [19]

Morrison

[11] Patent Number: 4,709,725
[45] Date of Patent: Dec. 1, 1987

[54] METAL-TO-METAL SEAL STRUCTURE
[75] Inventor: Bertram L. Morrison, Houston, Tex.
[73] Assignee: Vetco Gray, Inc., Houston, Tex.
[21] Appl. No.: 15,071
[22] Filed: Feb. 17, 1987
[51] Int. Cl.4 .............................................. F16L 37/28
[52] U.S. Cl. ............................ 137/614.04; 251/149.7; 277/236; 277/237 R
[58] Field of Search ................... 277/236, 152, 1, 237; 137/614.04; 251/149.7; 220/208

[56] References Cited

U.S. PATENT DOCUMENTS

| 2,405,152 | 8/1946 | Kilchenmann | 277/236 |
| 3,176,723 | 4/1965 | Hodgeman et al. | 277/236 |
| 3,373,998 | 3/1968 | Bialkowski | 277/236 |
| 3,537,478 | 11/1970 | Evans et al. | 137/614.04 |
| 4,371,004 | 2/1983 | Sysolin et al. | 251/149.7 |

FOREIGN PATENT DOCUMENTS 2159894 12/1985 United Kingdom ................ 277/152

Primary Examiner—A. Michael Chambers
Attorney, Agent, or Firm—Dodge, Bush & Moseley

[57] ABSTRACT

In accordance with an illustrative embodiment of the present invention, a seal structure that provides a leak-proof metal-to-metal seal against an opposing seal surface includes an annular body having an inwardly directed flange and an outwardly directed flange, each flange having a seal foot on the outer portion thereof. The inner foot engages the seal surface first and produces elastic bending of the inner flange as a cantilever beam, together with a rotation of the annular body which reduces the gap below the outer seal foot to zero. Then as the seal structure is forced further against the seal surface, a counter-rotation is applied to the body to correct the first-mentioned rotation, and the lower end face of the body engages the seal surface to provide a limit stop. Internal fluid pressures produce additional sealing forces that vary in proportion to such pressures.

22 Claims, 4 Drawing Figures

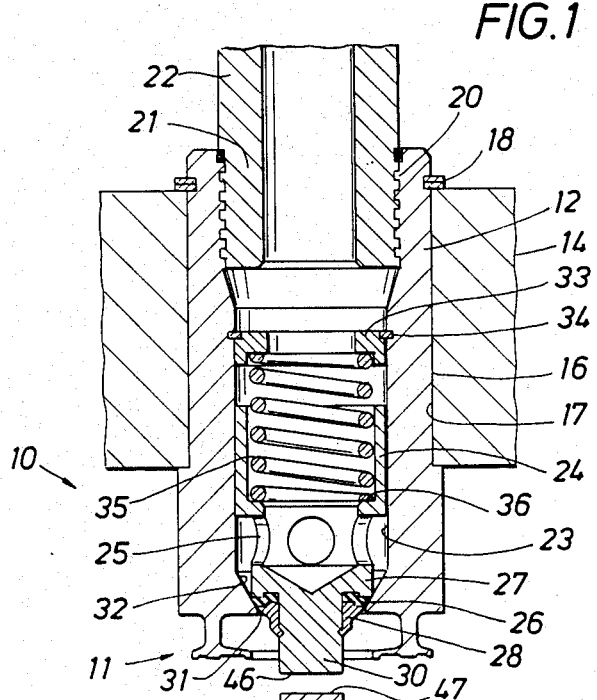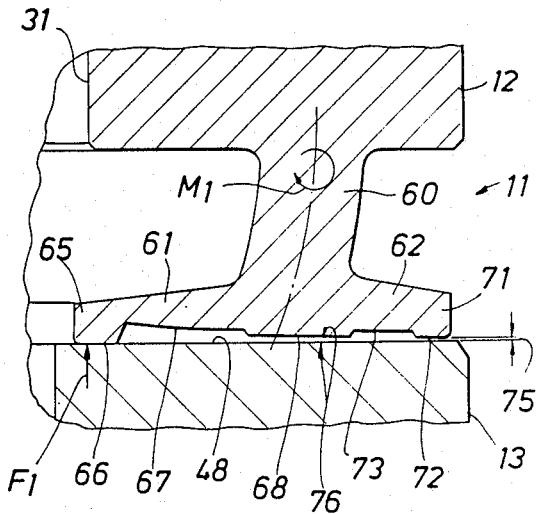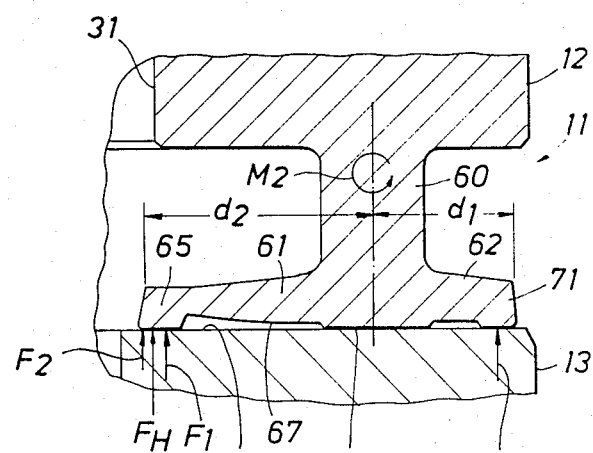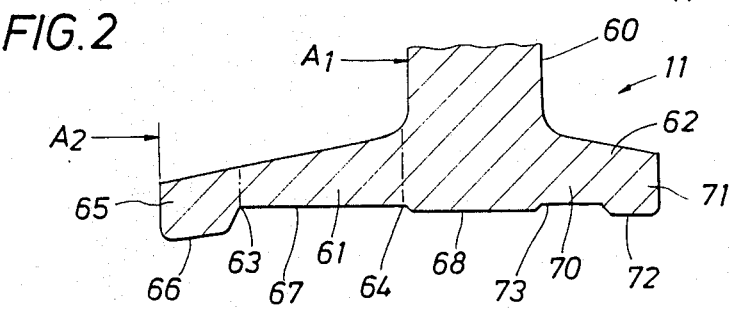

METAL-TO-METAL SEAL STRUCTURE

FIELD OF THE INVENTION

This invention relates generally to a leak-proof seal usable, for example, in a subsea well head control system, and particularly to a new and improved metal-to-metal face seal construction that will accommodate radial as well as planar misalignment and still provide a very high integrity seal with an adjacent seal surface.

BACKGROUND OF THE INVENTION

In hydraulic control systems or "pods" such as those used in operating onshore as well as offshore or subsea well head apparatus and blowout preventer stacks, it is necessary to provide releasable hydraulic line connections between each one of a plurality of hydraulic hoses in a hose bundle and a certain control passage or port that communicates with an instrumentality, such as a valve actuator or the like, whereby the various components of the wellhead can be remotely controlled or their respective positions indicated. Such connections typically are mounted on junction plates and include male and female fittings that can be brought together to provide what desirably are leak-tight connections between the various hoses and passages. A known system employs O-ring seals on the male connector members that seal within the bores of the female members to effect the sealed connections. Another type of system uses O-ring seals that are positioned in grooves in the female members.

However such prior systems have a number of disadvantages. For example, only a small amount of radial misalignment can be accommodated because the male and female fittings must mate coaxially within very close tolerances. The planar surfaces on which the respective male and female fittings are mounted must be substantially parallel, or else axial alignment of the fitting members will not be achieved on make-up. Seal surface roughness can not be tolerated. Adjustments must be provided to minimize any height deviations where multiple connectors are "ganged" on a common support plate. The machining tolerances that must be held in the manufacture of such prior systems have not allowed economic production. Of course O-ring seals are subject to damage due to pinching and extrusion, and are subject to blow-out when a fitting assembly is disconnected under pressure.

The general object of the present invention is to provide a new and improved seal structure that overcomes the foregoing disadvantages of prior systems.

Another object of the present invention is to provide a new and improved metal-to-metal face seal construction that will accommodate a degree of radial misalignment and still effect a leak-proof seal.

Another object of the present invention is to provide a new and improved metal-to-metal face seal apparatus that will accommodate a lack of precise parallelism of companion seal surfaces and still effect a leak-proof seal.

Another object of the present invention is to provide a new and improved face seal of the type described that is tolerant of surface roughness and which does not require special coating or plating on seal or seat surfaces.

Still another object of the present invention is to provide a new and improved metal-to-metal face seal structure that is tolerant of height deviations when multiple connectors are gauged on a common support plate.

Yet another object of the present invention is to provide a new and improved seal structure that can be manufactured from standard materials with standard machine shop equipment, and in an economic manner.

SUMMARY OF THE INVENTION

These and other objects are attained in accordance with the present invention through the provision of a seal structure comprising an annular metallic body or ring having a first, inwardly directed flexible flange and a second, outwardly directed flexible flange on one end portion thereof. The respective flanges can be considered to be circular cantilevered beams that are joined to an elastic foundation, which is the annular body. This thickness of each flange varies gradually from a thinner section near the outer edge of the flange, to a thicker section in the region where the flange joins the annular body. The lower surface of the outer peripheral edge portion of each flange is shaped to provide a seal foot that is adapted to rest on a mating seal surface when the seal structure is forced thereagainst. The lower outer surfaces of the flanges and the annular body are recessed in a manner such that only the seal feet initially engage the adjacent seal surfaces, and the outer seal foot has a vertical dimension such that when the inner seal foot first comes to rest against its companion seal surface, there is a gap or axial clearance between the outer seal foot and its companion seal surface. In a preferred embodiment, the effective radial length of the inner flange is approximately equal to one-half the difference between the inner diameter of the annular body and the inner diameter of the inner flange.

As the seal assembly is brought into engagement with a planar surface against which a seal is to be effected, the lower surface of the inner seal foot engages first, whereby the inner flange is axially and elastically deformed. This deformation produces a rotational effect on the annular body. The combination of annular body rotation and flexible bending of the inner flange produces an effective, elastic, metal-to-metal seal of the lower face of the seal foot against the seal surface. The flange and seal foot having high energy absorption capability, that is, high capacity for deflection without permanent deformation.

When sufficient axial force is applied to reduce the gap between the lower surface of the outer seal foot and the adjacent seal surface to zero, a moment is produced which rotates the annular body in the opposite direction. Such opposite rotation increases the amount of sealing pressure between the lower face of the inner seal foot and the seal surface on which it rests. At the same time the forceful engagement of the outer seal foot with the seal surface underneath it provides a secondary or back-up seal. The lower end surface of the annular body provides a stop when it engages the adjacent metal surface, which limits the maximum amount of deflection of both flanges and provides support for all additional vertical forces.

When the seal assembly is subjected to internal pressure, a hydraulic force is developed that is proportional to the magnitude of such pressure and the transverse cross-sectional area of the inner seal flange. This additional sealing force is highly desirable, because the total contact force available to maintain the seal is proportionally higher for higher working pressures.

BRIEF DESCRIPTION OF THE DRAWINGS

The present invention has other objects, features and advantages that will become more clearly apparent in connection with the following detailed description of a preferred embodiment, taken in conjunction with the appended drawings in which:

FIG. 1 is a cross-sectional view of the two halves of a hydraulic connector shown prior to make-up;

FIG. 2 is an enlarged, fragmentary, cross-sectional view of the seal structure of the present invention shown prior to engagement;

FIG. 3 is a view similar to FIG. 2 but showing the foot of the inner seal flange engaged with a companion seal surface; and FIG. 4 is a view similar to FIGS. 2 and 3 but showing the seal foot on the outer seal flange also engaged with its companion seal surface.

DETAILED DESCRIPTION OF A PREFERRED EMBODIMENT

Referring initially to FIG. 1, a hydraulic connector system 10 which includes a seal element 11 that is constructed in accordance with the present invention includes cylindrical upper and lower valve bodies 12 and 13 that are mounted on respective junction plates 14 and 15. The upper valve body 12 has a reduced diameter outer surface 16 that fits within a bore 17 on the plate 14, and a snap ring 18 is used to hold the member in place. An internal thread 20 in the upper end of the body 12 receives the threaded male fitting 21 on the lower end of a hydraulic hose 22 through which a hydraulic control fluid under pressure is supplied. An inner bore 23 in the valve body 12 receives a slidable poppet valve element 24 that is urged downwardly by a compressed coil spring 35. The upper end of the spring 35 reacts against a guide ring 33 which is prevented from moving upwardly by a retainer 34. The valve element 25 has a plurality of radial ports 25, and carries an elastomer, polymer or metal seal ring 26 that is held against a shoulder 27 by a suitable retainer element 28. An actuator extension 30 extends through and below an opening 31 in the lower end of the member 12. The seal ring 26 normally engages a conical valve seat 32 to close the opening 31 against downward flow. As described, the valve element 24 is a normally closed device requiring an upward force on the actuator 30 to raise the valve element to its open position.

The lower valve body 13 is mounted in the same way on the plate 15, and includes an identical but mirror image arrangement of a valve element 38, ports 39, seal ring 40, conical seat 41, and upwardly extending actuator extension 42. Hereagain a coil spring 43 reacts between a shoulder 44 and a guide ring 45 to bias the valve element 38 to the closed position. Downward force exerted on actuator extension 42 will cause the valve element 38 upward to shift downward against the bias force of the spring 43 to the open position.

In order to open the valve elements 24, 38, the plate 14 is lowered toward the plate 15 to cause the lower end face 46 on the extension 30 to abut the end face 47 of the extension 42. Such downward movement of the plate 14 also causes engagement of the seal element 11 with the upper end face 48 of the body 13 to effect a metal-to-metal seal that prevents fluid leakage out of respective bores 23 and 49 of the valve bodies 12 and 13. The seal element 11, which is constructed in accordance with the present invention, now will be described.

As shown in enlarged detail in FIG. 2, the seal element 11, which preferably is formed as an integral part of the lower end of the valve body 12, includes an annular body section 60 having an inwardly extending flange 61 and an outwardly extending flange 62 on the lower end portion thereof. The flange 61 has a gradually increasing sectioal thickness from the point 63 to the point 64 where it joins the annular body 60. The inner margin of the flange 61 is shaped to provide a seal foot 65 having a lower surface 66 that in the relaxed condition of the flange 61 is inclined at a small angle upwardly toward the annular member 60. The lower surface 67 of the flange 61 is provided by a recess as shown, and the lower end surface 68 of the body 60 extends slightly below the surface 67.

The outer flange 62 has a shorter radial dimension than the flange 61, but also has a central section that gradually increases in thickness toward the annular body 60. A seal foot 71 having a lower seal face 72 is provided near the outer edge of the flange 62, and the flange is provided with a recessed surface 73. The lower surface 66 of the seal foot 65 is located below both of the faces 68 and 72, and the seal face 72 is located slightly below the lower face 68 of the annular body 60.

OPERATION

The manner in which the seal element 11 operates to provide a leak-proof, metal-to-metal seal against the upper surface 48 of the valve body 13 now will be described. As the junction plate 14 is moved toward the plate 15 with the valve bodies 13 and 12 in approximate axial alignment, the extensions 30 and 42 engage one another to shift the valve elements 24 and 38 in opposite directions to their respective open positions. As the seal element 11 is forced against the upper surface 48 of the valve body 13, a sequence of events occurs which will be more readily apparent with reference to the enlarged drawing FIGS. 3 and 4. The seal element 11 is shaped and dimensioned such that the first surface engagement is between the seal foot 65 and that portion of the surface 48 which is immediately below the seal foot 65. As downward force is applied to the body 60, the inwardly directed flange 61 undergoes bending as a circular cantilevered beam until the lower face 66 of the foot 65 is flush against the surface 48 as shown in FIG. 3. Such bending applies a clockwise moment $M_1$ to the annular body 60, which causes the body to elastically deform as shown. At this point, a gap 75 still exists between the lower surface 72 of the outer seal foot 71 and the surface 48 immediately therebelow. A sealing pressure is produced of the inner seal foot 65 against the surface 48 which is a function of the combined deflections of the flange 61 and the wall of the annular body 60. As the flange 61 is deformed upward, a balanced beam effect is produced to cause the outwardly directed flange 62 to rotate downward and thereby close the gap 75. The reaction force $F_1$ of the surface 48 against the lower surface of the inner seal foot 65 is due to a combination of potential energies caused by the elastic deflection of the flange 61 and the elastic rotation of the annular body 60.

As the gap 75 is reduced to zero so that the lower surface 72 of the outer seal foot 71 comes to bear against the surface 48, a force $F_3$ is developed which introduces a secondary moment that continues to increase until the lower surface 68 of the annular body 60 is forced against the surface 48. As the gap 76 is reduced to zero, this secondary moment is applied to the body 60 in the opposite rotational direction, as indicated by $M_2$ in FIG. 4. This moment causes a counter-rotation of the body 60 which corrects the previous rotation so that the body 60 is straightened as shown. As such counter-rotation occurs, the reaction force of the surface 48 against the lower surface 66 of the inner seal foot 65 is increased by an additional amount $F_2$ approximately equal to the reaction force $F_3$ acting against the outer foot 71 times the ratio of the balanced beam distances $d_1$ and $d_2$ between the respective outer ends of the feet 71 and 65 and the vertical centerline of the body 60. The total sealing force of the inner foot 65 against the surface 48 due to the above-described deflections is the sum of the forces $F_1$ and $F_2$. The secondary seal provided by engagement of the outer foot 71 with the surface 48 is due to the reaction force $F_3$ acting thereagainst as described above. Engagement of the surface 68 on the lower end of the annular body 60 with the surface 48 provides a primary travel stop which limits the maximum deflection of both of the flanges 61 and 62 and provides support for any additional vertical forces on the body 60.

The pressure of hydraulic fluid in the passages 23 and 49 produces a dynamic force $F_H$ that further increases the contact pressure of the seal foot 65 against the surface 48. Since ambient or other low pressure is present in the region below the lower surface 67 of the flange 61, the internal pressure produces a reaction force $F_H$ that is proportional to the magnitude of the internal pressure and the difference in the transverse cross-sectional areas $A_1$ and $A_2$ of the flange 61 as shown in FIG. 2. The presence of the force $F_H$ is highly desirable because the total contact force that is available for sealing, which is the sum of the forces, $F_1$, $F_2$, and $F_H$, is proportionally greater for higher internal pressures.

Although a single hydraulic connector system 20 has been illustrated in the drawings, it will be recognized that the junction plates 14 and 15 can have a plurality of such connections located at various points or positions thereon, so as to enable the interconnection of a plurality of hydraulic control line hoses with a plurality of other hoses or control fluid passages.

It will be recognized that a new and improved metal-to-metal seal structure has been provided. Due to the unique construction of the present invention, it is unnecessary that there be precise radial alignment of the axial centerlines of the valve bodies 12 and 13 for an effective seal to be achieved. It also is unnecessary that the planes defined by the upper surface 48 of the valve body 13 and the lower surface of the valve body 12 by precisely parallel for an effective seal to be achieved. There can be a considerable degree of roughness of the surfaces 48, 66 and 72 without adverse effect on sealing capability. When multiple connector pairs are provided on common support plates, separate structures to correct for height deviations of the valve bodies 12 and 13 are not needed, because the structure of the present invention is inherently tolerant of such height deviations. The seal assembly 11 can be machined as an integral part of the valve body 12 as standard material, with standard machine shop equipment, and in a highly economic manner. No special coating or plating of such surfaces is required unless environmental or hydraulic fluid characteristics dictate otherwise. The seal structure 11 is not a "loose" seal element, as in prior devices, since it is machined or attached as an integral part of the valve body 12. Thus there is only one available leak path as compared to prior devices which have multiple potential leakage paths. Testing of the present invention has shown that it provides excellent seal repeatability and high integrity even after a large number of pulse testing cycles.

Since certain changes or modifications may be made in the present invention without departing from the inventive concepts involved, it is the aim of the appended claims to cover all such changes and modifications falling within the true spirit and scope of the present invention.

What is claimed is:

1. A seal structure for use in preventing fluid leakage from a flow path, comprising: an annular body having a first, inwardly directed flexible flange and a second, outwardly directed flexible flange; a first seal foot on the inner margin of said first flange; and a second seal foot on the outer margin of said second flange, said first seal foot having a lower surface that initially extends below the lower surface of said second seal foot, whereby when said seal structure is brought into engagement with a companion seal surface said first seal foot engages said seal surface first to induce elastic bending of said first flange and rotation of said body prior to engagement of said second seal foot with said seal surface.

2. The seal structure of claim 1 wherein engagment of said second seal foot with said seal surface produces a counter-rotation of said annular body that applies additional sealing force to said first seal foot.

3. The seal structure of claim 1 wherein said annular body has a lower end surface adapted to engage said seal surface, said end surface being initially located above said lower surface of said second seal foot, said end surface providing a stop limit to flexure of said flanges as said seal structure is forced against said seal surface.

4. The seal structure of claim 1 wherein the respective thicknesses of each of said flanges varies gradually from a lesser dimension near the outer edge thereof to a greater dimension where said flanges join said annular body.

5. The seal structure of claim 1 wherein said lower surface on said first seal foot initially lies in a conical plane that becomes a flat plane during upward flexure of said inwardly directed flange with respect to said annular body.

6. The structure of claim 1 further including a valve body having an end surface and a flow passage that opens through said end surface, said seal structure surrounding said flow passage and arranged to prevent fluid leakage therefrom.

7. The structure of claim 6 further including means providing a transverse cross-sectional area on said first flange that is subject to the pressure of fluids in said flow passage for applying sealing force to said first seal foot that is proportional to the magnitude of said pressure.

8. The structure of claim 6 wherein said annular body is formed as an integral part of said valve body and extends outwardly of said end surface.

9. The structure of claim 6 further including a support plate, and means for mounting said valve body on said support plate.

10. The structure of claim 6 further including a valve element slidable in said valve body, a valve seat surrounding said flow passage, said valve element being movable between a closed position against said valve seat and an open position away therefrom, and valve actuator means on said valve element arranged to extend through said seat and into said annular body.

11. The structure of claim 6 further including a second support plate, a second valve body mounted on said second support plate, said seal surface being provided on an end face of said second valve body.

12. A connector apparatus for use in a hydraulic system that is employed in remote control of a subsea wellhead or the like, comprising: a first junction plate having at least one valve means thereon for normally closing the end of a hydraulic control line, said valve means having an outlet; a second junction plate having at least one valve means thereon for normally closing the end of another hydraulic control line, said last-mentioned valve means having an inlet; actuator means for automatically opening said valve means to communicate said outlet with said inlet when said junction plates and said valve means are moved relatively toward one another; and a seal structure on one of said valve means engageable with said other valve means when said valve means are open to prevent leakage of hydraulic fluid, said seal structure including an annular body on one of said valve means having an inwardly directed flange and an outwardly directed flange on the outer end thereof, a first, circumferentially continuous seal foot on the inner margin of said inwardly directed flange, a second, circumferentially continuous seal foot on the outer margin of said outwardly directed flange, said first seal foot having a bottom surface that in the relaxed condition of said inwardly directed flange extends beyond the corresponding bottom surface of said second seal foot, whereby when said seal structure is engaged with a companion seal surface on the other of said valve means, said first seal foot engages said seal surface before said corresponding bottom surface engages said seal surface to induce elastic bending of said inwardly directed flange and rotatio of said annular body.

13. The apparatus of claim 12 wherein subsequent engagement of said bottom surface of said second seal foot with said seal surface produces a counter-rotation of said annular body which intensifies the sealing pressure of said first seal foot against said seal surface.

14. The apparatus of claim 13 further including a stop surface on the outer end of said annular body which initially is located inwardly of both of said bottom surfaces of said seal feet, engagement of said stop surface with said seal surface providing a limit to flexure of said inwardly directed flange.

15. The apparatus of claim 14 wherein said inwardly directed flange has a sectional thickness that varies gradually from a lesser dimension near said first seal foot to a greater dimension where its inwardly directed flange joins said annular body.

16. The apparatus of claim 15 wherein said outwardly directed flange has a sectional thickness that varies gradually from a lesser dimension near said second seal foot to a greater dimension where said outwardly directed flange joins said annular body.

17. The apparatus of claim 14 wherein said bottom surface of said first seal foot initially has a frusto-conical shape which is flexed to become a planar shape when said stop surface engages said seal surface.

18. The apparatus of claim 17 further including means providing recessed regions on the respected outer surfaces on said flanges between said stop surface and each of said seal feet.

19. The apparatus of claim 12 wherein said outlet is substantially coaxially aligned with said outlet, said annular body providing a flow channel between said outlet to said inlet, said seal surface surrounding said flow channel.

20. The apparatus of claim 19 wherein said annular body is formed as an integral part of said one valve means.

21. The apparatus of claim 20 wherein each of said valve means includes a spring-biased valve element, said actuator means comprising projections on each of said valve elements that are adapted to engage one another to shift said valve elements to their respective open positions.

22. The apparatus of claim 13 further including means for providing a transverse cross-sectional area on said inwardly directed flange that is subject to the pressure of hydraulic fluid for applying sealing force to said first seal foot that is proportional to the magnitude of said pressure.

* * * * *